United States Patent [19]

Latter et al.

[11] 4,359,118

[45] Nov. 16, 1982

[54] ENGINE SYSTEM USING LIQUID AIR AND COMBUSTIBLE FUEL

[75] Inventors: Albert L. Latter, Marina del Rey; James L. Dooley; R. Philip Hammond, both of Santa Monica, all of Calif.

[73] Assignee: R & D Associates, Marina del Rey, Calif.

[21] Appl. No.: 216,565

[22] Filed: Dec. 15, 1980

Related U.S. Application Data

[63] Continuation-in-part of Ser. No. 73,894, Sep. 10, 1979, which is a continuation-in-part of Ser. No. 958,056, Nov. 6, 1978, Pat. No. 4,226,294.

[51] Int. Cl.³ .......................... B60K 3/02; F01K 25/06
[52] U.S. Cl. .................................... 180/54 B; 60/671; 180/303
[58] Field of Search ...................... 180/54 B, 303, 302, 180/301; 60/671, 648, 651, 683; 62/54

[56] References Cited

U.S. PATENT DOCUMENTS

| | | | |
|---|---|---|---|
| 3,293,850 | 12/1966 | Morrison | 60/648 |
| 3,830,326 | 8/1974 | Hartung | 180/303 |
| 3,838,576 | 10/1974 | Geffs | 62/54 |
| 4,187,689 | 12/1980 | Selcukoglu | 62/54 |

FOREIGN PATENT DOCUMENTS

| | | | |
|---|---|---|---|
| 2524261 | 12/1975 | Fed. Rep. of Germany | 60/671 |
| 27153 | of 1899 | United Kingdom | 60/671 |

Primary Examiner—David M. Mitchell
Attorney, Agent, or Firm—Poms, Smith, Lande & Rose

[57] ABSTRACT

An engine system operates on liquid air and LNG, with the LNG being burned to obtain more energy from an expansion engine using the liquid air as the working fluid; and the liquid air is employed to trap or prevent the undesired venting of LNG fumes, which could otherwise burn or explode.

10 Claims, 11 Drawing Figures

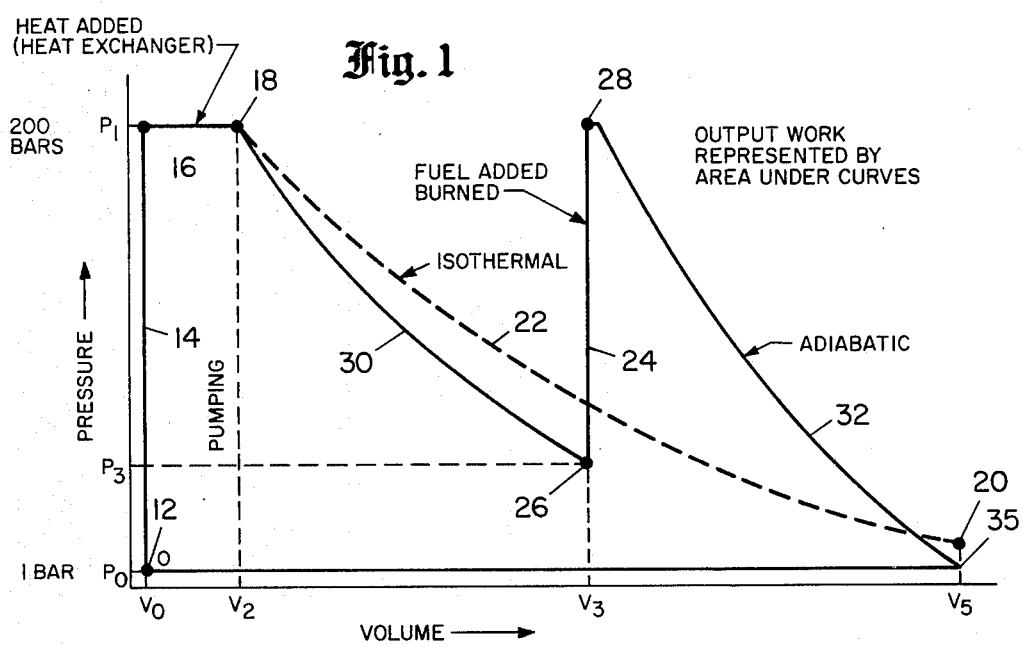
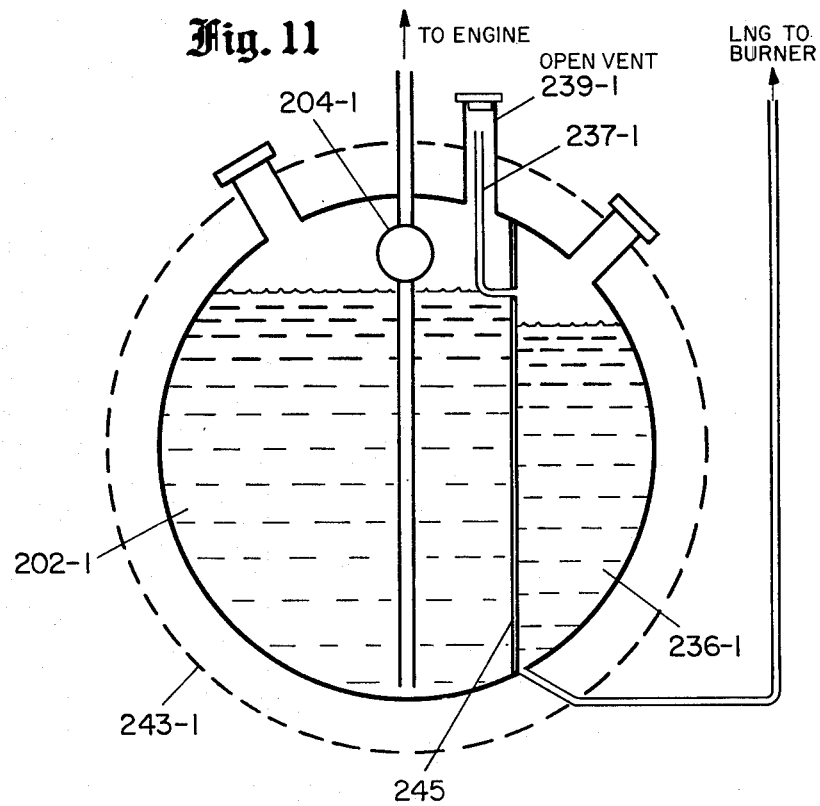

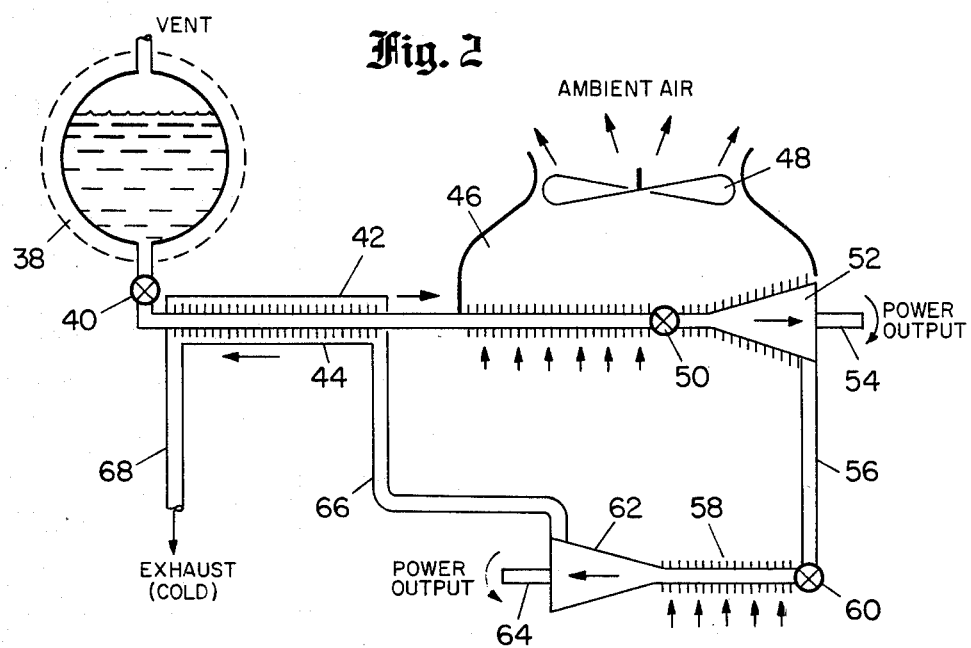
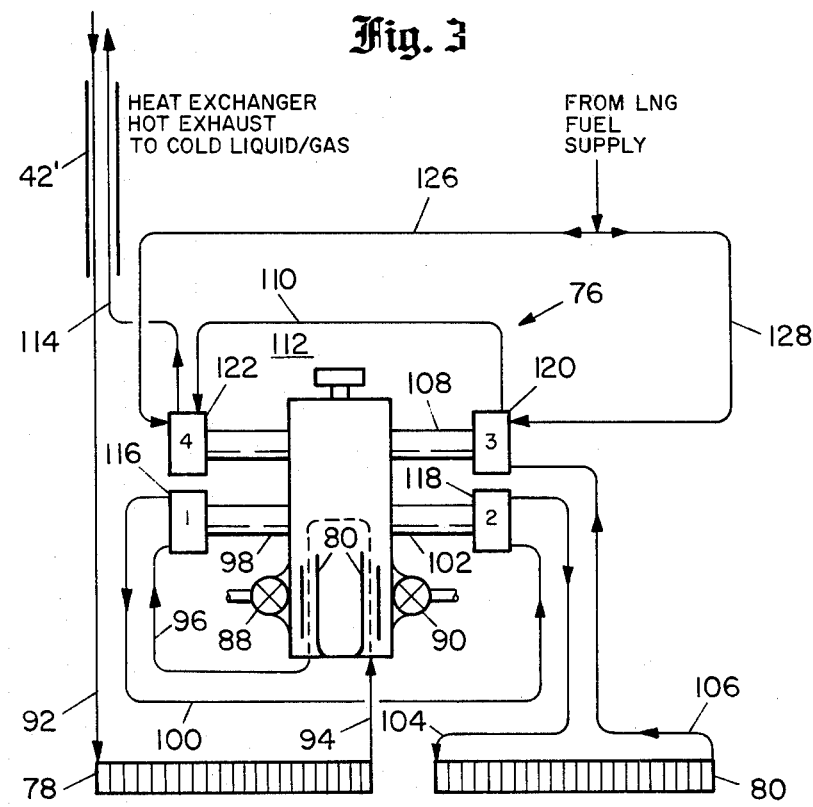

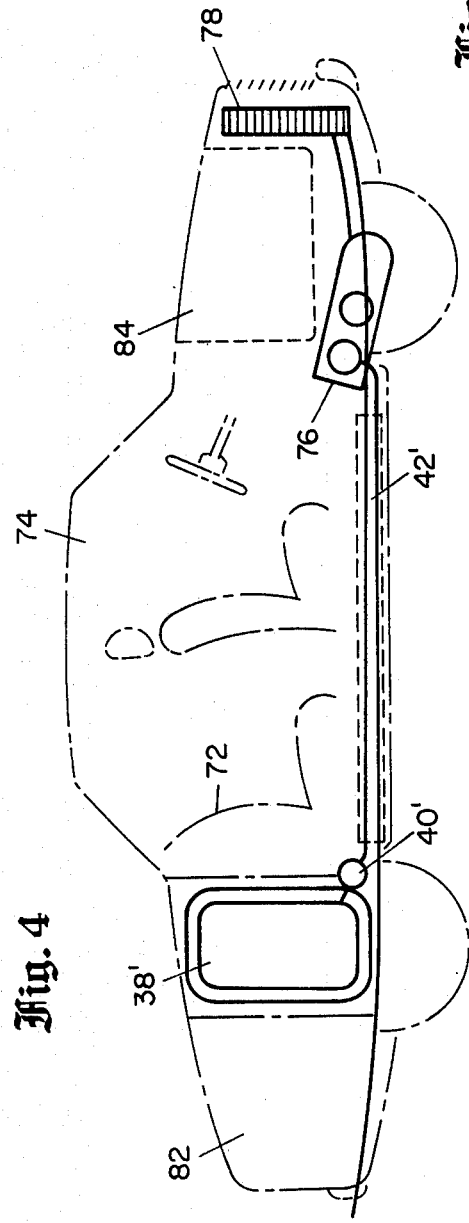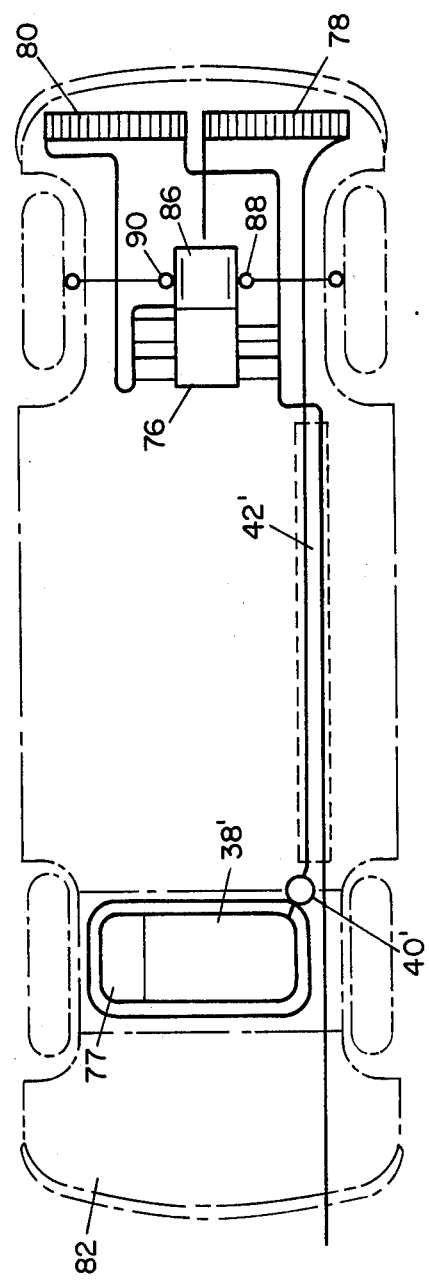

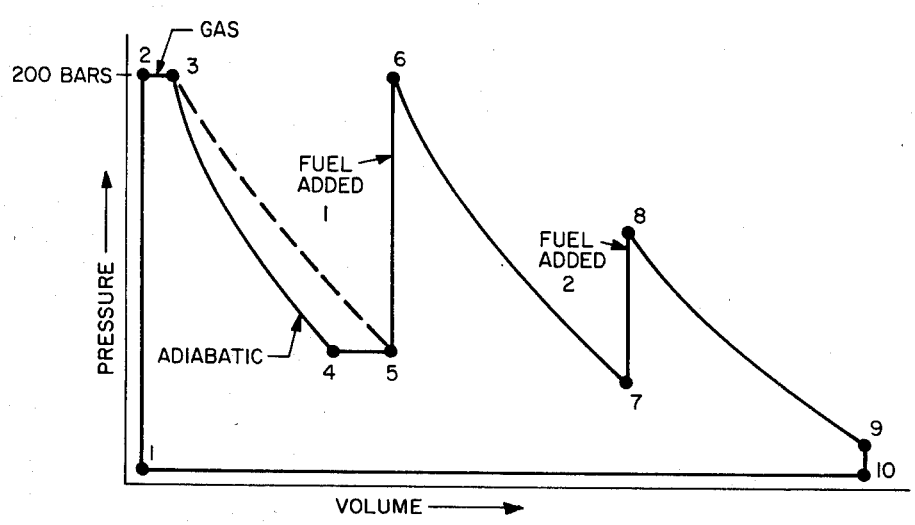

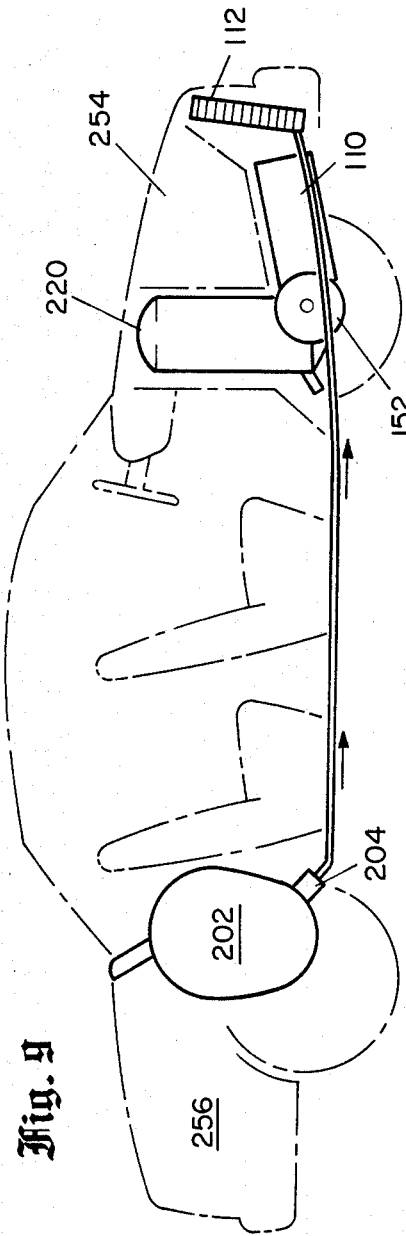
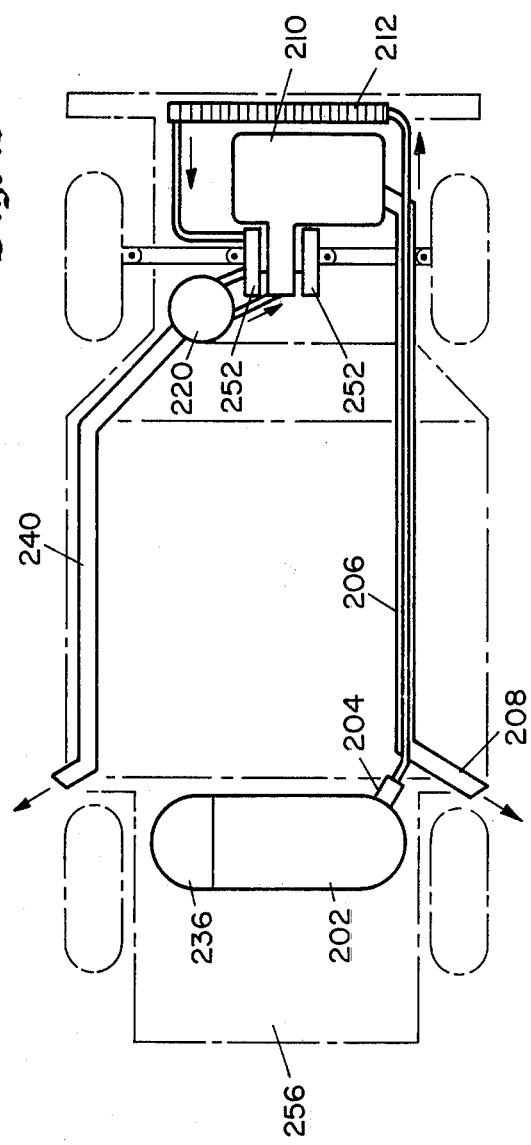

ENGINE SYSTEM USING LIQUID AIR AND COMBUSTIBLE FUEL

RELATED PATENT APPLICATION

This patent application is a continuation in part of our co-pending U.S. patent application, Ser. No. 073,894, filed Sept. 10, 1979, which is in turn a continuation in part of U.S. patent application Ser. No. 958,056 filed Nov. 6, 1978, now U.S. Pat. No. 4,226,294, granted Oct. 7, 1980.

FIELD OF THE INVENTION

This invention relates to engines operating on liquified atmospheric gases and LNG (liquid natural gas, principally methane) as the principal energy sources.

BACKGROUND OF THE INVENTION

Part I

It has previously been proposed to store energy in the form of a liquified gas, such as liquid nitrogen. This liquid or its natural counterpart, liquid air, can be stored and transported in a well-insulated vessel. Energy may be recovered for use from this liquified gas by three simple steps:
1. Pressurization of the liquid to a high pressure by pumping.
2. Vaporization of the cold liquid and heating of the gas from the ambient environment.
3. Expansion of the gas from high pressure to atmospheric pressure in an appropriate engine expander to do useful work.

As noted above, the foregoing has been previously proposed, but the results are so poor that it is of little use for ordinary transportation. A heavy load of liquified gas is required for any reasonable range in an automotive application, and the operating cost is unacceptably high. However, the system does have a number of favorable features including low pollutant levels, and the fact that liquid hydrocarbon fuels are not directly consumed.

Part II

In accordance with the disclosure of the prior patent applications, of which this is a continuation, a composite engine cycle is employed in which liquified gas, such as liquid air or liquid nitrogen, is expanded and warmed both from the ambient and also by combustion of suitable fuels, either on an internal or an external combustion basis. When liquid air is used, the oxygen in the air itself may enter into the combustion process, both in the case of internal and external combustion.

One embodiment uses a special temperature topping cycle for the liquified air or nitrogen, using any convenient fuel such as gasoline, diesel, or the like, after taking as much substantially isothermal expansion as is practical. In this composite cycle, the liquified gas is first pumped to high pressure and warmed by heating with atmospheric air as in prior systems, and is partially expanded, after which it is reheated and expanded partially again several times, thus approaching isothermal expansion. At the point where it is not practical to continue this process, the gas is heated to a higher temperature by the internal burning of a small amount of injected fuel with the oxygen available from the liquid air. This heat injection at substantially constant volume raises the cylinder pressure to the point where the gas can be expanded adiabatically down to atmospheric pressure with the exhaust temperature in the order of ambient temperature. This process not only enables us to get more energy from the cold gas, but also uses the heat energy injected by the fuel in a more efficient manner.

It is to be understood that various combinations of gas expansion without fuel being added, and two or more cycles of heating gas by the addition of combustible fuel, may be employed.

Another embodiment uses external combustion where heating may take place at constant pressure, while in the case of internal combustion the heating occurs at substantially constant volume.

The resulting engines can thus achieve a more acceptable mileage on the cryogenic liquid and a truly phenomenal mileage on the combustible fuel, in accordance with the analysis set forth in the body of the present specification. The combined cost of these two consumables in the new engine cycles is thereby reduced to a level of practical interest.

Additional aspects involve (1) countercurrent heat exchange arrangements for heating the incoming pressurized liquid air or nitrogen with the warm exhaust gases; (2) selectively directing a portion of the liquid air from the engine to the external combustion unit; and (3) utilizing heat exchangers to pick up ambient heat where possible, for example, from conventional automobile radiator locations, as well as heat from engine friction losses and from vehicle braking.

The apparatus is particularly advantageous for use in automobiles. Thus, by way of example and not limitation, the liquid air storage container could be located toward the rear of the vehicle, behind the passenger compartment and the engine toward the front. Then, the liquid air could be heated as it is brought forward, and the exhaust or exhausts, from the engine and or furnace could be directed rearward in heat exchanging relationship with the cold gas conduit. Similarly, when used in combination with an automobile, the presently proposed power plant has a number of conveniently available sources of heat, including radiator absorption, engine frictional heat, and the like, as discussed above, all of which may be employed to add energy to the (originally) liquified gas.

The apparatus has the following advantages:
1. It greatly extends the mileage attainable on fossil fuel.
2. It reduces dependence on liquid fossil fuel.
3. It may utilize a wide variety of types of fuels.
4. The liquid gas or air consumable can be "recharged" at reasonable cost anywhere there is electric power and a cryostat available.
5. There is no long distance transportation problem, as liquid air can be readily made from the atmosphere anywhere.
6. The exhaust from the automotive powerplant is exceptionally cool and clean—well within all proposed legal limits of emissions without the need for catalytic converters, exhaust recirculation, or the like.

It is further noted that the combinational use of liquid air and a combustible fuel for automotive propulsion will provide a greater operative range than both of the fuels when used alone. More specifically, for example, a mid-sized car could travel about 66 kilometers on 190 kilograms of liquid air using a pure liquid air engine, and could travel about 134 kilometers on nine kilograms of diesel oil in a car using a diesel engine. This makes a total of 200 km, using the two propulsion sources separately. However, because of the complementary nature of the two propulsion materials, a combinational external combustion engine, using 190 kg liquid air and 9 kg of diesel fuel has a range of 300 kilometers, as compared with the 200 kilometer figure noted above. This increase of 100 kilometers or 50 percent is a product of the remarkable synergistic combination of the two diverse fuels in the system as disclosed herein.

SUMMARY OF THE INVENTION

In accordance with the present invention it has been determined that LNG (Liquid Natural Gas, or any similar correspondingly cold liquid fuel) may be advantageously employed as the fuel, in combination with the cryogenic gas, such as liquid air or liquid nitrogen; and with the undesired venting or diffusion of the LNG vapors being prevented by cooling from the liquid air or liquid nitrogen. Preferably a venting tube from the top of the LNG tank will extend upward through the liquid air tank to a point in the vicinity of the vent from the liquid air tank. Further, the geometry is arranged to preclude blocking of the LNG vent by condensation or the like. Also, the two tanks may either be located together, with insulation around both, and with a thin thermal barrier between them; or spaced apart and separately insulated.

With the boiling point of LNG at about 161.5 degrees centigrade, and that of liquid nitrogen being about 195.8 degrees centigrade, the colder temperature of the liquid nitrogen will cause condensation of any natural gas vapors which might be rising from the surface of the LNG. The condensed LNG will then run back down the walls of the venting tube into the main body of the liquid natural gas.

While clean burning LNG is a most desirable fuel to use in this system, it is important that combustible fumes are not vented off as the automobile is not being used. Any such diffusion into a confined space, of such combustible fumes, could be dangerous. However, by using the liquid air or liquid nitrogen which is already present in the system, to condense the fumes, the potential problem is neatly and inexpensively solved while LNG vapor loss is reduced to zero.

Other objects, features, and advantages of the invention will become apparent from a consideration of the following detailed description and from the accompanying drawings.

BRIEF DESCRIPTION OF THE DRAWINGS

FIG. 1 is a simplified typical theoretical pressure-volume diagram illustrating certin principles relating to the present invention using internal heating;

FIG. 2 is a diagrammatic showing of a power plant operating in accordance with FIG. 1;

FIG. 3 is a diagrammatic showing of an automotive engine employing liquid air and LNG fuel injection in an internal combustion engine;

FIGS. 4 and 5 are diagrammatic showings of a conventional passenger automobile equipped with the present system;

FIG. 6 is a typical pressure-volume diagram for the engine of FIG. 3;

FIGS. 9 and 10 are schematic showings of a side view and a plan view, respectively, of one possible automotive installation for the system of FIG. 7; and FIG. 11 is an alternative liquid air tank and LNG tank configuration which may be employed in the present systems.

DETAILED DESCRIPTION

Figure 7:
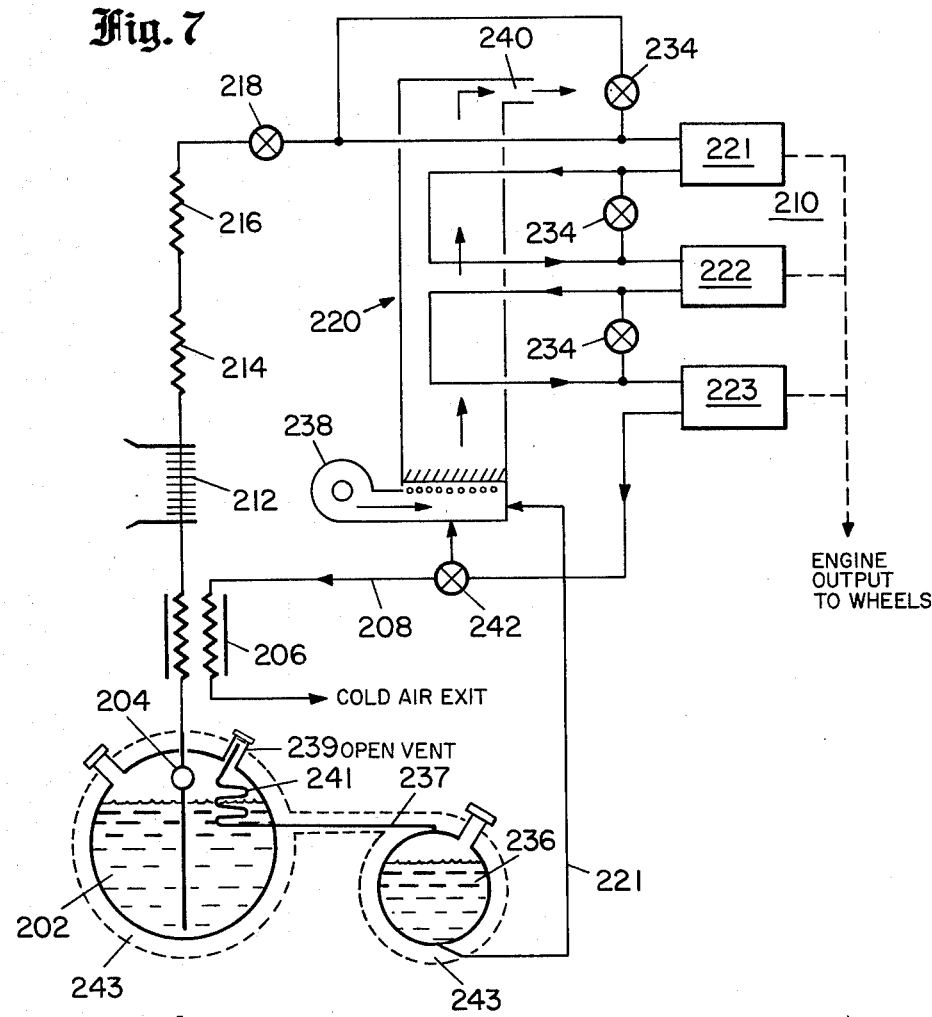
FIG. 7 is a diagrammatic showing of an external combustion embodiment illustrating the principles of the invention.

In the following detailed description much of the description is drawn from the prior specifications of the cases identified hereinabove. The principal additional material is included in connection with the description of the tanks of LNG and of liquid air and their relationship, as described particularly in connection with FIGS. 7 and 11, and at the end of the specification.

Referring more particularly to the drawings, FIG. 1 is a pressure-volume diagram which provides a general comparison of the mode of operation of the apparatus of the type of the present invention, as compared with prior known engines operating with initially cryogenic fluids. More specifically, point 12 in FIG. 1 represents liquid air stored at atmospheric pressure prior to utilization in the engine. Normally the liquid air would be stored in a properly insulated tank, as it is at a temperature in the order of 77 degrees Kelvin, or −196 degrees centigrade. For reference, on the Kelvin scale, absolute zero is designated "0", and freezing and boiling temperatures for water are approximately 273 degrees K. and 373 degrees K., respectively.

Returning to FIG. 1, the initial step as represented by the line segment 14, extending from starting point 12 to point 16, is to pump the liquid air to an elevated pressure, which may for example be 200 atmospheres, or 200 bars, with little or no change in specific volume. The pressurized liquid air is then passed through heat exchangers, and the resultant phase change from liquid to gas is represented by the line segment between point 16 and 18 in FIG. 1, involving a volume change.

In comparing what has been previously done with the mode of operation of the present apparatus, attention is directed to point 20 which is at the far right in FIG. 1. This point represents air at one atmosphere or one bar of pressure, and its volume at a temperature approximately ambient as the expansion from point 18 was along the dashed line 22 isothermally (at constant temperature). Following dashed line 22 implies that ambient heat is added throughout the expansion process. Solid line 30 represents a more practical expansion which approaches adiabatic conditions where little heat is added during the expansion process.

After expansion along the adiabatic line 30 the gas becomes cold. This embodiment of the present apparatus involves the addition of heat by the internal burning of fuel, as represented by the vertical line segment 24, extending between points 26 and 28 in the solid line characteristic of FIG. 1. Accordingly, following an expansion and the accomplishing of useful work as indicated by line segment 30 extending from point 18 to point 26, the initially cryogenic liquid is heated to a temperature well above the ambient, and the pressure is increased to a high pressure such as the 200 bar level of point 16. Additional work is performed by the heated and compressed gas, as indicated by the expansion line segment 32 which extends from point 28 on to a final point 33 which is at atmospheric pressure and at which temperature is in the order of the ambient.

The work performed by the cryogenic fluid as it expands is represented by the area under the curves. In the case of the present invention, in accordance with one exemplary cycle of operation, the work performed is represented by the area under the curve extending from point 16 to point 18, and then along line segment 30 to point 26, up along line segment 24 to point 28, and then along line segment 32 to point 33. In a scale graph, the area under the solid line curve 18, 26, 28, 33 including line segments 30 and 32, is much greater than the area lying under curve 22. Further, as set forth quantitatively below, the amount of fuel required to increase the temperature and the pressure of the gas from point 26 to point 28 is relatively small, compared with the additional work which is obtained.

Incidentally, it may be noted that the line segment 30 is designated as being "isothermal", whereas the line segment 32 is designated as being "adiabatic". The cycle is normally quite rapid in a practical engine, and there is little opportunity for the absorption of heat. Accordingly, the temperature normally drops exponentially proportional to the increase in gas volume. When a series of steps are undertaken in the expansion of the gas, with a heat exchanger being employed between each successive expansion, the resultant characteristic may be substantially "isothermal". This mode of operation is indicated by the line 30, and it is understood that this might actually be made up of a series of short adiabatic expansions together with the intermediate usage of heat exchangers to increase the temperature of the gas following the adiabatic expansion and resultant cooling of the gas. Incidentally, in considering the plot of FIG. 1, the last expansion to point 20 might well be at a temperature somewhat below the ambient, because it immediately follows an adiabatic expansion as represented by line segment 32.

Before proceeding to consideration of illustrative implementations, it is useful to note the properties of air, and its principal components, nitrogen and oxygen. In this connection, it is noted that air is made up of about 4/5ths nitrogen and 1/5th oxygen with a few minor trace gases which are not of great significance in connection with the present invention. In the following table, some of the pertinent thermodynamic and other properties of nitrogen, oxygen, and air are set forth.

TABLE I

|  | Nitrogen | Air | Oxygen |
|---|---|---|---|
| Symbol | N2 | — | O2 |
| Molecular weight | 28.0 | — | 32.0 |
| Liquid boiling temp. °K. | 77.0 | — | 90.0 |
| Liquid density gm/cm$^3$ | 0.81 | 0.87 | 1.14 |
| Latent heat of vaporization plus heating to ambient ergs/gm × 10$^9$ | 4.27 | 4.23 | 4.02 |
| Electric power to liquefy (theoretical) kWh/kg | 0.12 | 0.12 | 0.11 |
| kWh/gallon | 0.33 | 0.33 | 0.34 |
| Electric cost at 3 cents kWh and 25% plant efficiency cents/gal. | 3.96 | 3.96 | 4.00 |

From the foregoing table, the liquid boiling temperature of nitrogen and oxygen of 77 degrees Kelvin and 90 degrees Kelvin respectively may be noted. In the centigrade scale, this means that oxygen boils at about −183 degrees and nitrogen at about −196 degrees; and in the Fahrenheit scale, the respective figures are approximately −297 degrees and −320 degrees. Accordingly, in the storage of these very cold liquids, it is necessary to have well-insulated containers.

Now, referring to FIG. 2, in this schematic representation of an engine, the liquified gas is stored in the insulated storage tank 38, and this would correspond to the starting point 12 of the pressure volume plot of FIG. 1. From the tank 38 the liquified gas is pumped up to a high pressure by the pump 40, corresponding to section 14 in the plot of FIG. 1. From the pump 40, the gas passes through a counter flow heat exchanger 42 in which the warm exhaust from the output of the engine is employed to heat up the incoming liquid gas and change it into the gaseous state. The fins 44 in the heat exchanger 42 enhance heat transfer. A larger heat exchanger 46 draws air from the ambient by means of the fan indicated diagrammatically at 48, and further increases the temperature of the gas from the heat exchanger 42. This section of the cycle corresponds to the horizontal line between points 16 and 18 in FIG. 1. Under the control of valving 50, the gas is supplied to an expansion engine 52, which provides power to the output shaft 54. Known types of expansion engines may be employed, with the simplest form being a piston in a cylinder to which the high pressure gas is supplied, with the energy being employed to move the piston and the power take-off mechanisms connected to it.

At the output 56 from the first stage expansion engine 52, the gas is still at an elevated pressure, but may be at a temperature below ambient. After valving 60, in the heating apparatus 58, the gas is raised to an elevated temperature and pressure by periodically burning fuel (for example, LNG as discussed below) prior to being used in the adiabatic expansion engine 62. Power output from engine 62 is indicated at shaft 64. The exhaust gases from engine 62 are transmitted through conduit 66 to the outer zone of the countercurrent heat exchanger 42, and are cooled as the incoming liquified gas changes to the gaseous state. Accordingly, the exhaust gases at 68 from the engine are relatively cool.

Concerning the unit 58 where additional fuel, such as LNG is supplied and burned, this may be either external combustion with no chemical interaction with the original liquified gas supplied in the tank 38; or alternatively, the LNG may be burned with the oxygen present as one component of the liquified air originally supplied in tank 38. However, the heat must be added intermittently after closure of valve 60 to insure a constant volume pressure rise as shown by line 24 on FIG. 1. When the internal combustion alternative is employed, the inert nitrogen and the combustion products are both supplied to the adiabatic expansion engine 62.

FIGS. 3, 4 and 5 will now be considered together. These three figures are a schematic showing of one illustrative installation of an expansion engine in accordance with the present invention, mounted in a conventional passenger car.

Referring first to FIGS. 4 and 5, the location of the insulated storage tank 38' may suitably be behind the rear seat 72 of the vehicle 74. The high pressure pump 40' and the heat exchanger 42' may be located as indicated in FIGS. 4 and 5 with the high pressure pump immediately adjacent the tank 38', and the heat exchanger 42' extending from the vicinity of the pump 40' in the rear of the vehicle up to the vicinity of the expansion engine 76. The heat exchangers 78 and 80 may suitable be located at the front of the vehicle, generally in the location of conventional automobile radiators. A rear baggage compartment B2 is somewhat reduced in capacity in view of the relatively large size required for the liquid air storage tank 38'; however, the expansion engine 76 is substantially smaller than a conventional automobile engine and a front baggage compartment 84 may therefore also be provided.

A suitable LNG storage tank 77 may be provided, and it may be physically adjacent the liquid air tank 38' as shown in FIG. 5, or spaced therefrom. The preferred venting arrangements for the LNG tank will be described below.

FIG. 6 is a pressure-volume diagram indicating the mode of operation of the engine of FIG. 3 where two constant volume heat injections are used. In addition, Table II indicates the pressure, the volume and the temperature at various points in the engine of FIG. 3, for a typical operating cycle.

In FIG. 6, there are a number of encircled numbers at the break points of the various line and curve segments. These encircled numbers running from "1" to "10" correspond exactly to the "stations", as listed in Table II set forth below. In addition, in Table II, the precise points corresponding to each of the stations are indicated in parenthesis immediately after the station numbers.

TABLE II

| Station | | Pressure Bars | Specific Volume | Temp. Degrees. K. |
|---|---|---|---|---|
| 1 | (in tank 38') | 1 | 1.15 | 77 |
| 2 | (output of pump 40') | 200 | 1.15 | 77 |
| 3 | (in conduit 96) | 200 | 6.27 | 400 |
| 4 | (in conduit 104 after cyl. 102) | 50 | 16.78 | 268 |
| 5 | (after heat absorber 80) | 50 | 18.85 | 300 |
| 6 | (after fuel injection 120) | 200 | 18.85 | 1200 |
| 7 | (conduit 110) | 20 | 104 | 659 |
| 8 | (after second fuel injection 122) | 36 | 104 | 1200 |
| 9 | (after expansion cyl. 112) | 5.5 | 416 | 738 |
| 10 | (exhaust) | 1 | 1400 | 450 |

Incidentally, the vehicle shown in FIGS. 3, 4 and 5 is provided with a differential gear box 86, and inboard disc brakes 88 and 90, which are cooled by the liquid air flow, thereby picking up all available heat losses in the system—and saving consumtables.

Now, referring to the flow of gas in the schematic showing of FIG. 3, the high pressure air from the countercurrent flow heat exchanger 42' is routed through conduit 92 to the heat absorber unit 78 and then through the conduit 94 through the differential 86 and the disc brakes 88 and 90. The high pressure air is then supplied through conduit 96 to the first stage expansion piston 98. From piston 98, it is routed through the conduit 100 to the second stage expansion piston 102. More ambient heat is absorbed in the heat absorber 80, with the gas path being determined by the conduits 104 and 106, with conduit 106 routing the warmed air to the cylinder 108. At cylinder 108, gasoline or other suitable fuel is injected and burned, raising the temperature of the gas to a level such as 1200 degrees K., prior to expansion in cylinder 108. The output gases from cylinder 108 are routed by the conduit 110 to the final expansion cylinder 112, where additional fuel is added prior to the final extraction of work from the gas. Exhaust gases from cylinder 112 are transmitted to the countercurrent heat exchanger 42' through the conduit 114.

Suitable valving for the timed actuation of the pistons 98, 102, 108, and 112 are included in the units 116, 118, 120 and 122 associated respectively with the cylinders. In addition, the blocks 120 and 122 include suitable fuel metering arrangements to supply suitable amounts of LNG to the air which is to be heated, with the LNG being provided from the LNG tank 77 over lines 126 and 128.

In examining Table II and FIG. 6, it may be noted that the lower left-hand corner of FIG. 6 has the reference numeral "1" which refers to Station 1, representing the conditions in the tank 38', prior to pumping. Then, each successive number represents additional points on the curve of FIG. 6 and additional stations listed in Table II. Particularly interesting features include the fact that Station "6" is at a pressure of approximately 200 atmospheres, which has been employed as a practical upper limit of pressures which can easily be handled, and also is at a temperature of 1200 degrees Kelvin, which was taken as a temperature which could also be readily handled in accordance with known techniques.

In the case of Station "8", the pressure was only raised to approximately 36 bars, in view of reaching the temperature of 1200 degrees K., which has been accepted as the upper limit for the purposes of the present example. It may also be noted that the curve between point "3" and point "4" is actually made up of expansions in cylinder 98 and also cylinder 102. Also, the horizontal section of the plot between points "4" and "5" represents the expansion in the heat absorber 80 shown in FIG. 3. It is believed that the remainder of the information supplied by FIG. 6 and Table II are self-explanatory.

In Table III set forth below, the weight comparison of a present gasoline auto is compared with that of a cold engine auto, using a full load of fuel. For the purposes of Table III, we are using a full sized American car averaging about 20 miles per gallon of gasoline. On the basis of $4.3 \times 10^{11}$ ergs/gram (18,500 Btu/lb) from the combustion of gasoline, 15% average engine efficiency, about $5.5 \times 10^9$ ergs are required at the engine flywheel for every meter travelled. This average energy requirement has been employed in the calculations for Table III.

The illustrative example of our engine employing cryogenic and internal combustion of LNG fuel, delivers $6.5 \times 10^9$ ergs per gram of liquid air used, to the engine output shaft when the expansion efficiency is 85%. Using these figures, 0.85 kilograms of liquid air are required for each kilometer which is to be travelled. To ensure a 300 kilometer (186 miles) driving range, about 250 kilograms (85 gallons) of liquid air is required and about 4.2 kilograms (2.36 gallons) of LNG of equivalent is needed.

The weight comparison is set forth in Table III below:

TABLE III

| Weight Comparison (Full Load of Fuel) | Present Gasoline Automobile (Kilograms) | Cold Engine Automobile (Kilograms) |
|---|---|---|
| Engine | 420 | 220 |
| Heat Exchangers | 50 | 130 |
| Air Conditioner | 50 | Not required |
| LNG Fuel and Tank | 65 | 7 |
| Liquified gas and container | — | 300 |
| Exhaust | 15 | 10 |
| Total Powerplant System - | 600 | 667 |

In reality, the foregoing comparison is unnecessarily unfavorable as regards the cold engine auto of the present invention. More specifically, on the average, people usually drive with a gas tank or fuel supply which is not more than ⅜th of a tank of gas or other fuel. Using this figure as the average weight of the vehicle, the cold engine auto weight comes down close to that of present automobiles.

Returning to a detailed description of the figures of the drawings, attention is now directed to FIGS. 7 through 10 which relate to an external combustion, constant pressure embodiment of the invention.

Referring to FIG. 7, it includes the liquid air storage tank 202 corresponding to the tank 38 shown in FIG. 2 and other prior figures of the drawings. From the storage tank 202, the liquid air is pumped to an elevated pressure such as 200 atmospheres, or 200 bars, by the pump 204. The high pressure liquid air is then transmitted through the dry heat evaporator, or countercurrent heat exchanger 206 for heating through a transfer of heat from the exhaust gas flowing through conduit 208 from the expansion engine 210. The cold gas then passes through a heat absorber 212 or other arrangements for increasing the temperature of the cold gas toward the ambient and then through heat exchangers 214 and 216 to pick up additional heat from vehicle braking and from heat losses of other mechanical parts such as the transmission or the engine drive. The somewhat warmer air is then supplied to the power control valve 218.

The power plant itself includes a furnace 200 and a series of expansion cylinders 221 through 223 of progressively increasing size corresponding to the reduced pressure and increased volume of the gases as energy is extracted in the successive cylinders. Gases from the control valve 218 are heated in passing through the furnace 220 along conduit 226, and are then supplied to the piston type expansion cylinder 221 which is, per se, of a conventional type. From expansion cylinder 221, the gases are routed back through furnace 220 through the heat exchanging conduit section 228 and then to the successive expansion cylinders 222 and 223, with additional intermediate heating stages.

In order to avoid the application of gases at excessively high temperatures to the expansion cylinders 221 through 223, a series of bypass, "temperature control" valves 234 are provided, and operated on a thermostatic basis to bypass some or all of the gases past the furnace 220 when temperatures rise beyond the maximum acceptable temperature for the expansion cylinders.

LNG fuel is supplied from the storage tank 236 to the furnace 220 along fuel line 221, and air is provided from the variable capacity air blower 238. Incidentally, when maximum power from the engine is desired, the power control valve 218 would be opened wide, and the air blower would be operated at full air capacity to provide maximum heat transfer in the furnace 220.

It may be noted in passing that the hot exhaust at the exhaust conduit 240 from the surface 220 contains moisture or water vapor as one of the normal combustion products, and therefore is not employed directly in the cooling of the very cold air close to the tank 202, as the moisture would no doubt condense and form ice in the exhaust passages. Instead, the dry exhaust from the expansion cylinder 208 is employed in the dry heat evaporator 206. Incidentally, a valve 242 may be provided to direct a portion of the exhaust air from the expansion cylinders 221 through 223 to the furnace 220.

The valve 242 is designed to permit the direction of some desired fraction of the air from the expansion cylinders toward the furnace 200. By this technique, an automatic reduction in the air flow is accomplished when the engine is operating at reduced speeds or outputs. Care must be taken with regard to the use of valve 242 and the air from the expansion cylinder 123, as prolonged sitting of the vehicle could cause some slight oxygen enrichment, whereby the effect on combustion in furnace 220 would be increased for a given amount of exhaust gas from the expansion cylinders 221 through 223.

The physical configuration of the cryogenic tank 202 and the LNG tank 236, and the control of gases from the LNG tank, are an important part of this invention. In FIG. 7, the temperatures of the LNG and the colder liquid air or liquid nitrogen are noted. To avoid the danger of the boiling off of the combustible LNG fumes, they are vented by the vent tube 237 which terminates within the outer end of the vent 239 from the tank 202.

Incidentally, both tanks 202 and 236, as well as the LNG vent line 237 are provided with heavy outer insulation layers 243. Within tank 202, the vent line 237 is coiled, at 241, to insure full cooling of the LNG vapors. With the temperature of the liquid air well below the boiling point of the LNG, the vapors condense and flow back into tank 236 along the walls of vent tube 237.

The termination of vent tube 237 within the open vent 239 so that the end of tube 237 is not exposed to the atmosphere is important to avoid condensation, freezing and possibly blockage of vent tube 237. Alternatively if vent tube 237 has its outer end exposed, some of the vented liquid air could be heated to near the ambient in a heat exchanger and routed back through the outer few inches of the LNG vent tube to assure freedom from condensation and blockage.

Figure 8:
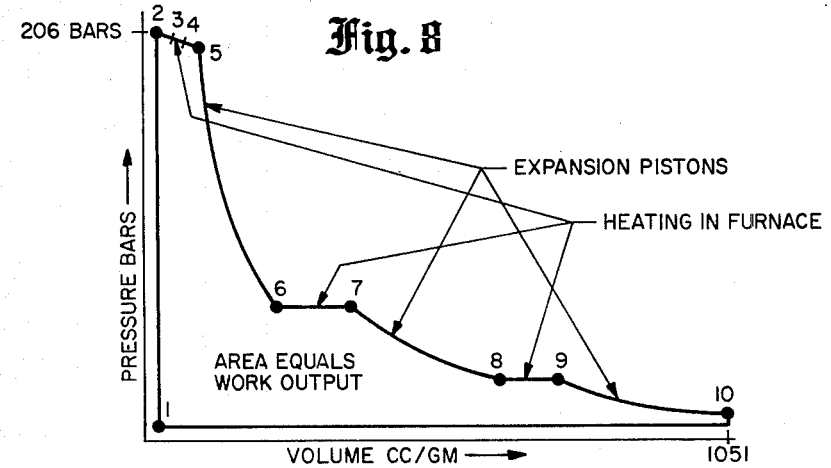
FIG. 8 is a schematic pressure-volume diagram for the system of FIG. 7.

FIG. 8 is a schematic pressure volume diagram for a continuously flowing system of the type shown in FIG. 7, with three expansion cycles of pistons. FIG. 8 is not drawn to scale. In Table IV set forth below, the pressure, volume and temperature is tabulated for each of the ten stations shown in FIG. 8, with one gram of the working medium being considered to proceed through the cycle. Now, the plot of FIG. 8 will be considered on a station by station basis.

Station 1. This station represents the liquid in the cryogenic Dewear container. The liquid air is at one atmosphere pressure, and is at 77 degrees Kelvin (with 273 degrees Kelvin being equal to freezing temperature of water in the Kelvin scale), and has a specific volume of about 1.15 cc. per gram.

Station 2. The liquid air has now been pumped up to system operating pressure. A pressure of slightly above 200 bars, or 200 atmospheres (3,000 psi) is shown for illustrative purposes. The temperature is the same as in the Dewar container, and the specific volume is reduced only slightly.

Station 3. Station 3 represents the evaporated liquid, now a gas at about ambient temperature, still at high pressure, and at greatly increased specific volume.

Station 4. The air has passed through the engine crank case to pick up frictional heat losses and around the normal inboard disc brakes to pick up regenerative braking energy from the vehicle. The pressure is still in the order of 200 bars (less any pressure drop) and the temperature would be in the order of 400 degrees K. or about 260 degrees F.

Station 5. At this point, the air has just come from the furnace. It is hot, in the order of about 1,000 K. (1340 degrees F.) and ready to enter the first stage of the expansion engine.

TABLE IV

Pressure-Volume Table Relating to FIG. 8

| STATION (Sta.) | PRESSURE (bar) | TEMPERATURE (°K.) | SPECIFIC VOLUME (cc/gm) | ENERGY (erg/gm $\times 10^9$) from prior sta. |
|---|---|---|---|---|
| 1 | 1.0 | 77 | 1.15 | |
| 2 | 206.0 | 77 | ~1.15 | −0.25 |
| 3 | 204.0 | 300 | — | — |
| 4 | 202.0 | 400+ | — | — |
| 5 | 200.0 | 1000 | 15.12 | +2.75 |
| 6 | 45.0 | 695 | 46.72 | +2.32 |
| 7 | 44.0 | 1000 | 68.75 | +0.95 |
| 8 | 9.6 | 695 | 218.0 | +2.32 |
| 9 | 9.4 | 1000 | 322.0 | +0.95 |
| 10 | 2.0 | <695 | 1051.0 | +2.32 |
| TOTAL WORK ON PISTONS | | | | 10.99 |
| WORK TO OUTPUT AT 85% efficiency | | | | 9.34 |
| HEAT INPUT FROM FUEL (LNG) | | | | 12.70 |
| GRAMS LNG PER GRAM AIR | | | | 0.025 |

Station 6. Between station 5 and station 6, the gas drives one of the expansion pistons such as those shown at 121 through 124 in FIG. 7. This is a substantially isotropic expansion, and the temperature at Station 6 is in the order of 695 degrees K. (790 degrees F.) depending upon the expansion efficiency. This relatively cool air is then directed back to the LNG fueled furnace for reheating.

Station 7. This station is similar to Station 5 except that it is at a lower pressure. The air has been reheated at constant pressure and is entering the second expansion stage. This process is repeated several times, until the pressure is too low or the volume too great for further useful expansion.

After the last expansion, the air is still warm and will be used to evaporate the incoming liquid air with this dry heat to avoid ice formation on the very cold tubes. It should be noted that the latent heat of vaporization of liquid air is about 1/10 that of water so there is adequate heat in the exhaust for vaporization.

FIGS. 9 and 10 indicate one possible arrangement of the system of FIG. 7 installed in a passenger vehicle. For convenience the reference numerals employed in FIG. 7 have been carried over to FIGS. 9 and 10. Interesting points to be noted in connection with FIG. 10 include the extended countercurrent heat-exchanger 206, which may also be referred to as a dry-heat evaporator, as the liquid air or liquid nitrogen becomes a gas during this transit. From the heat exchanger 206, the cold gas is routed through the heat absorber 212 which is located at the front of the vehicle in the place of the usual radiator. From the radiator 212 the gas is routed to the inboard brakes designated 252 in FIG. 10 where further heat is absorbed.

FIG. 9 is particularly of interest in showing the available luggage space 254 at the front of the vehicle and 256 at the rear of the vehicle. The engine 210 is relatively small and, therefore may be located below the luggage space 254.

FIG. 11 shows alternative arrangement of the LNG tank 236-1 and the liquid air or liquid nitrogen tank 202-1, and the outer layer of heavy insulation 243-1. If the LNG were to be held at the lower temperature of the liquid air, it would become "slushy" and not flow freely. Accordingly, a thin insulating or thermal barrier 245 is provided which permits the LNG to be at a somewhat higher temperature, but avoids the more rapid generation of LNG fumes which might otherwise occur. Accordingly, a simpler LNG vent tube configuration 237-1 may be employed, as compared with that shown in FIG. 7.

Incidentally, the designation "LNG" is used in the present case to refer to liquified natural gas, and other similar fuels which boil at relatively low temperatures, well below ambient levels.

Turning to economic considerations, on the basis of the average energy requirement when driving a mid-sized automobile (about $5.5 \times 10^5$ joules per kilometer traveled as noted hereinabove), the LNG fuel and liquid air consumption can be predicted. The new vehicle compares favorably weightwise with present automobiles. More particularly, a standard gasoline driven automobile weighs in the order of 3,200 pounds (1454 kg) without fuel, and about 3,270 pounds (1486 kg) with fuel. On the other hand, the present liquid air-coal automobile would weigh approximately 3,150 pounds (1432 kg) without fuel and about 3,520 pounds (1600 kg) with a full load of liquid air and coal. The volume of propellant required for a 300 km. (186 mile) range is larger with liquid air, but is still quite acceptable because the engine is so much smaller. Based on liquid air costing 15 cents per gallon (5.1 cents per kg), gasoline costing $1.20 per gallon (44 cents per kg), and LNG costing about 0.65 per gallon (41 cents per kg), the cost of consumables per mile traveled is about five cents for both liquid air/LNG and five cents for gasoline. However, we believe the cost of gasoline can only go up while the cost of liquid air should go down as the production required for widespread use increases. Although the cost of LNG will also go up, such a small quantity is used that it will have little effect on the liquid air/LNG costs. Accordingly, from these figures the new system is clearly competitive with prior system and will be consistent with our national goal of shifting from liquid to fossil fuels in our energy consumption.

As an important feature of the invention, it is noted that the use of liquid air or liquid nitrogen as an automotive power source is very appealing. More particularly, of course, there would be no polluting emissions from a pure liquid air vehicle, as compared with the noxious combustion products of gasoline powered cars. Also LNG is very clean burning and produces a very low level of emissions.

For completeness, the following Table V is included to give specific technical data on LNG in combination with gasoline and liquid air.

TABLE V

| TECHNICAL DATA | | | |
|---|---|---|---|
| | Gasoline | LNG or Methane | L'air |
| Density | 0.73 | 0.41 | 0.87 |
| lb/gal | 6.1 | 3.46 | 7.25 |
| Boiling point °C. | 100 | −161.5 | −195.8 |
| Theoretical energy to liquefy - kWh/gal | — | 0.44 | 0.38 |
| Heat of combustion - Btu/gal | 112,850 | 74,400 | — |
| Cost (no tax) $/gal | 1.00 | 0.45 (gas) 0.20 liquified | 0.15 |
| $/$10^6$ Btu | 8.86 | 6.00 | — |

TABLE V-continued
TECHNICAL DATA

|  | Gasoline | LNG or Methane | L'air |
|---|---|---|---|
| Cents/mile | 5.0 | 5.0* | 5.2** |

*LNG used in modified standard internal combustion engine
**LNG and L'air use in combination.

The remarkable result outlined above is a result of the "synergistic" combination of liquid air as a source of energy, and the burning of LNG, and the discovery that the vehicle range from the concurrent use of these two diverse sources of energy is much greater than the sum of each one used alone. From another standpoint, the dual use of the liquid air both as a source of energy and for trapping LNG fumes is noted, and this dual use of the liquid air may also be considered to be "synergistic".

In conclusion, it is to be understood that the foregoing description is merely illustrative of the principles of the invention, and that minor modifications are clearly within its scope. Thus, by way of example and not of limitation, instead of a reciprocating type piston engine, other known forms of engines may be employed, with positive displacement type engines being preferred. Similarly, the invention is applicable to other types of vehicles and other engines, as well as to automobile engines.

For completeness and as characterized above, the following patents relating to expansion engines using cryogenic fluids, are noted:

U.S. Pat. No. 3,257,806, granted June 28, 1966; U.S. Pat. No. 3,451,342, granted June 24, 1969; U.S. Pat. No. 3,531,933, granted Oct. 6, 1970; U.S. Pat. No. 3,589,126, granted June 29, 1971; U.S. Pat. No. 3,613,385, granted Oct. 19, 1971; U.S. Pat. No. 3,826,096, granted June 30, 1974; U.S. Pat. No. 3,987,632, granted Oct. 26, 1976; and U.S. Pat. No. 3,998,059, granted Dec. 21, 1976. Of course, none of these patents disclose combinational use of LNG and liquid air both for heating of the liquid air and also using the liquid air to prevent the dangerous venting of the LNG.

What is claimed is:

1. A safe and economical automobile system utilizing a combinational engine for operating on liquified cryogenic gas and LNG as energy sources comprising:
   an automobile;
   a first insulated tank for storing liquified cryogenic nitrogen or air mounted in said automobile;
   means for pumping said liquified gas to an elevated pressure;
   first heat exchanger means for warming said high pressure liquified gas toward the ambient whereby it changes to the gaseous state;
   second heat exchanger means located in the said automobile to receive heat from the ambient air and further warm the pressurized gas, as said automobile moves forward;
   a second insulated tank for storing LNG as a combustible fuel in said vehicle;
   means for venting said second tank for storing LNG;
   means for cooling said LNG venting means by cooling from said first insulated tank to cause the LNG vapor to condense and flow back into said second tank;
   means for burning said fuel to heat the pressurized gas; and
   multi-stage expansion engine means for receiving said pressurized gas, permitting it to expand, and obtaining useful work therefrom.

2. A system as defined in claim 1 wherein means are provided for mounting said first and second tanks adjacent one another, with a heavy insulation layer around both of said tanks, and a light thermal barrier between said tanks.

3. A system as defined in claim 1 wherein the means for venting the LNG tank includes a venting conduit extending to the vicinity of a vent provided for said first tank.

4. A system as defined in claim 1 wherein said insulated tanks are mounted at the rear of the passenger compartment of said automobile and wherein said expansion engine means is mounted in front of said passenger compartment, and elongated countercurrent heat exchange means are provided for conducting gas from said tank to said engine, and for conducting exhaust gases from said engine to the rear of the vehicle, while concurrently warming the cryogenic gas.

5. A combinational engine for operating on liquified cryogenic gas and LNG as energy sources comprising:
   a first insulated tank for storing liquified air or nitrogen at cryogenic temperatures;
   means for pumping said liquified gas to an elevated pressure;
   heat exchanger means for warming said high pressure liquified gas toward the ambient whereby it changes to the gaseous state;
   a second insulated tank for storing LNG as a combustible fuel;
   means for preventing the diffusion of LNG from said second tank by condensing vapors from the LNG by cooling from the liquified air or nitrogen; and
   means for burning said fuel to heat said pressurized gas; and
   multi-stage expansion engine means for receiving said pressurized gas, permitting it to expand, and obtaining useful work therefrom.

6. A system as defined in claim 5 wherein means are provided for mounting said first and second tanks adjacent one another, with a heavy insulation layer around both of said tanks, and a light thermal barrier between said tanks.

7. A system as defined in claim 6 wherein a venting tube extends from near the top of the second LNG tank upwardly into the first cryogenic gas tank.

8. A system as defined in claim 7 wherein said first cryogenic gas tank is provided with a vent near the top thereof, and wherein the vent tube from the second LNG tank terminates adjacent the vent from said first tank.

9. A system as defined in claim 7 including means for maintaining said LNG venting tube free from condensation or other possible blockage.

10. A combinational engine system for operating on liquified cryogenic gas and LNG as energy sources comprising:
   a first insulated tank for storing liquified air or nitrogen at cryogenic temperatures;
   a second insulated tank for storing LNG as a combustible fuel;
   means for preventing the diffusion of LNG from said second tank by condensing vapors from the LNG by cooling from the liquified air or nitrogen; and
   engine means for both burning said fuel and for receiving said originally liquified gas and permitting it to expand, to obtain useful work both from said LNG fuel and from the expansion of the originally liquified air or nitrogen.

* * * * *